US007929698B2

(12) United States Patent  
Candelore

(10) Patent No.: US 7,929,698 B2
(45) Date of Patent: Apr. 19, 2011

(54) SELECTIVE ENCRYPTION TO ENABLE TRICK PLAY WITH ENHANCED SECURITY

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 977 days.

(21) Appl. No.: 11/818,787

(22) Filed: Jun. 15, 2007

(65) Prior Publication Data

US 2008/0310630 A1 Dec. 18, 2008

(51) Int. Cl.
*H04N 7/167* (2006.01)
*H04L 29/06* (2006.01)
(52) U.S. Cl. ......... 380/239; 380/216; 380/217; 713/160
(58) Field of Classification Search .............. 380/205, 380/210, 216, 217, 239; 713/160, 193; 370/389
See application file for complete search history.

(56) References Cited

U.S. PATENT DOCUMENTS

| 5,805,700 | A | * | 9/1998 | Nardone et al. ............. 380/217 |
| 6,445,738 | B1 | | 9/2002 | Zdepski et al. |
| 6,453,115 | B1 | | 9/2002 | Boyle |
| 7,151,833 | B2 | | 12/2006 | Candelore et al. |
| 2002/0184506 | A1 | * | 12/2002 | Perlman ......................... 713/182 |
| 2004/0181666 | A1 | * | 9/2004 | Candelore ..................... 713/160 |
| 2005/0094809 | A1 | | 5/2005 | Pedlow, Jr. et al. |
| 2006/0093045 | A1 | * | 5/2006 | Anderson et al. ......... 375/240.28 |
| 2007/0040934 | A1 | * | 2/2007 | Ramaswamy et al. ..... 348/385.1 |
| 2007/0091886 | A1 | | 4/2007 | Davis et al. |

FOREIGN PATENT DOCUMENTS

WO WO 02/15579 A1 2/2002

OTHER PUBLICATIONS

International Search Report and Written Opinion, PCT/2008/065437, Mar. 2, 2009.
"Protection of MPEG-2 Multicast Streaming in an IP Set-Top Box Environment," Seong Oun Hwang et al; ETRI Journal, vol. 27, No. 5, pp. 595-607; Oct. 2005.
"Balancing Control and Freedom," Cable & Satellite International website, pp. 17-21, Jan.-Feb. 2006.
"Harmonic's On-Demand Delivery Platform," White Paper, Apr. 2007.
"Transmission of Non-Telephone Signals, Information Technology—Generic Coding of Moving Pictures and Associated Audio Information: Systems;" International Telecommunication Union, Section 2.4.3, pp. 17-39. Jul. 1995.

* cited by examiner

*Primary Examiner* — Jung Kim
*Assistant Examiner* — Abdulhakim Nobahar
(74) *Attorney, Agent, or Firm* — Miller Patent Services; Jerry A. Miller

(57) ABSTRACT

Certain embodiments consistent with the present invention involve a method of selectively encrypting digital video content that involves receiving a plurality of packets containing the digital video content; identifying packets containing start of frame (SOF) headers; inserting padding into the packets containing SOF headers to move the content of the packets containing the SOF headers to a previous or subsequent packet and create padded packets containing the SOF headers; selecting certain of the packets for encryption according to a selection criterion, wherein the selected packets exclude the padded packets containing SOF headers; encrypting the selected packets; and retaining the padded packets containing the SOF headers unencrypted to form selectively encrypted digital video content. Corresponding decoding method as well as encoding and decoding apparatus are also taught. This abstract is not to be considered limiting, since other embodiments may deviate from the features described in this abstract.

40 Claims, 4 Drawing Sheets

SELECTIVE ENCRYPTION TO ENABLE TRICK PLAY WITH ENHANCED SECURITY

CROSS REFERENCE TO RELATED DOCUMENTS

This application is related to U.S. Pat. No. 7,151,833 issued Dec. 19, 2006 to Candelore et al. which is hereby incorporated by reference, as are all documents cross-referenced and incorporated by reference therein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

When digital video such as MPEG (Moving Pictures Expert Group) digital video is played back in various trick play modes, access to I frames, P frames or B frames is generally required. I frames, P frames or B frames contain information that can be used to directly represent an image, whereas images are created with B frames by referencing and modifying preceding and/or subsequent I frames and P frames. As an example, when playback is carried out at 2× or 4× speed, the playback algorithm jumps from I frame to I frame or P frame to P frame to speed up the presentation of the video frames while skipping certain frames. B frames are needed for slower than 1× speeds.

Unfortunately, when content is encrypted using traditional encryption techniques, trick play becomes difficult or impossible since content has to be decrypted in order to find the I frames, P frames and/or B frames. This therefore makes it impossible to record the content with the same encryption as delivered over the delivery system. In the case of unencrypted content, these frames are accessed by calculating an offset from the start of frame (SOF). In U.S. Pat. No. 7,151,833 to Candelore, et al., selective encryption is used as a remedy to this problem. In accord with certain embodiments disclosed in this patent a method of selectively encrypting and decoding digital video content is provided in which certain of the packets are selected for encryption according to a selection criterion, wherein the selected packets exclude packets containing start of frame (SOF) headers. The selected packets are encrypted while retaining the packets containing the SOF headers unencrypted to form selectively encrypted digital video content. In recording selectively encrypted digital video content to a storage medium, offsets are calculated for at least one of I frames and P frames from the SOF headers and the calculated offsets are stored as an offset table. The offset table can then be accessed to enable trick play of the selectively encrypted digital video content. In this manner, trick play can be accomplished expediently.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
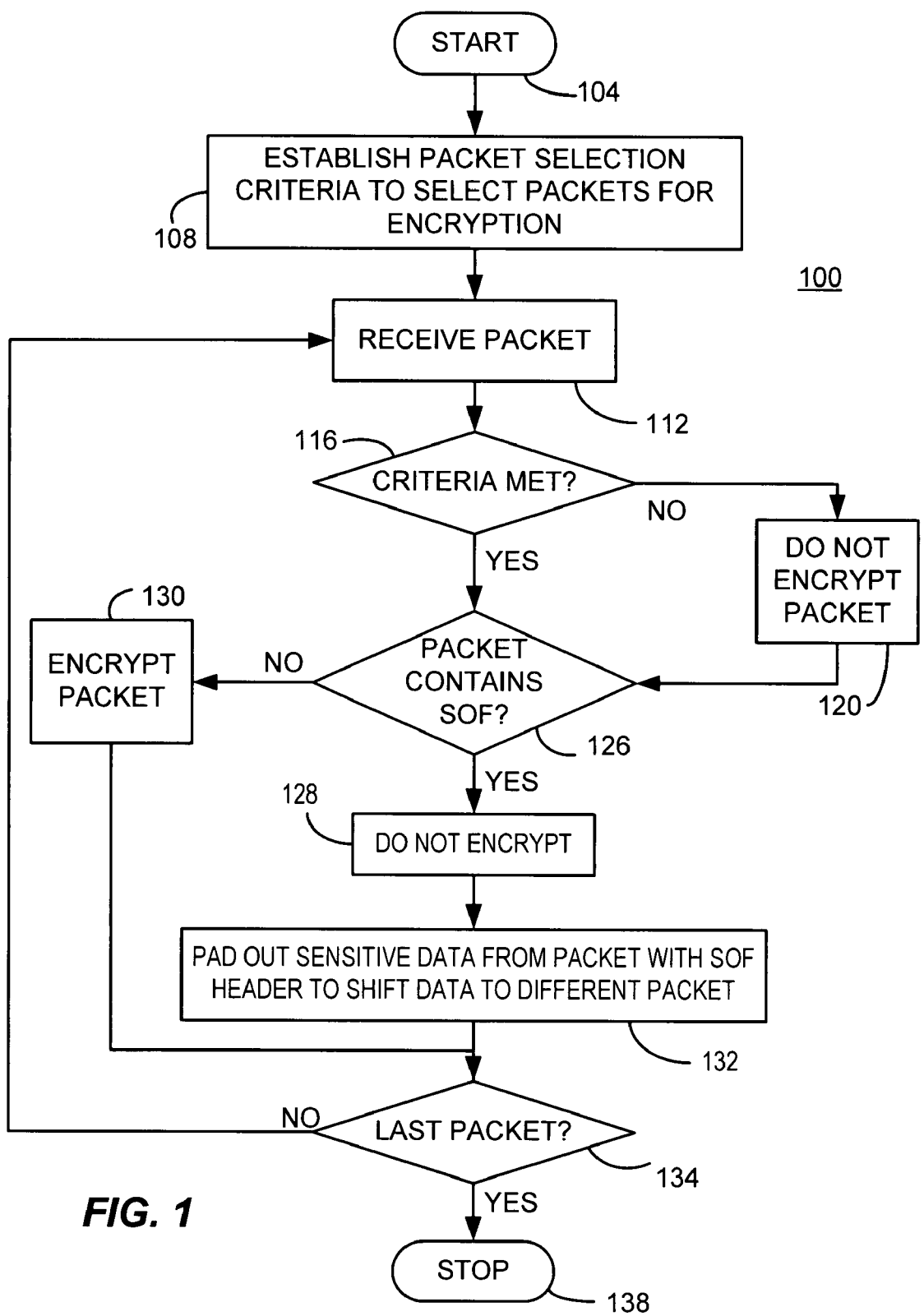
FIG. 1 is a flow chart showing a selective encryption process and decoding process consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The terms "scramble" and "encrypt" and variations thereof are used synonymously herein. The term "video" may be used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein.

The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "single partial encryption" embodiment, but those skilled in the art will recognize that the present invention can be utilized to realize dual or multiple partial encryption without departing from the invention.

The above-referenced commonly owned patent and the patent applications cross-referenced therein describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The present invention applies similar selective encryption techniques to the problem of enabling trick play with encrypted digital video content. The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be persistently scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content, so long as the packets containing the SOF header is not encrypted, as will be explained later.

Currently there is a problem with delivering content to a personal-video-recorder (PVR) enabled set-top box is that to enable trick play it must be first descrambled. If the content is downloaded "opportunistically" from a carrousel at night, then descrambling (and locally re-scrambling) the content can cause a security problem. Keys used to locally re-scramble the content will not be as secure as those from the conditional access (CA) element. The content on the hard drive might be accessed without paying the appropriate viewing fees. Ideally, content delivered "opportunistically" or speculatively to a local drive of a set-top box would remain CA scrambled on the hard drive.

In accordance with certain embodiments consistent with the present invention, selective encryption is utilized to encrypt selective portions of content, but leaves the packets containing the SOF header in the clear (unencrypted). By leaving the SOF header unencrypted, trick play circuits and algorithms can operate properly. Specifically, it is the picture frame start code and the picture_coding_type identifier of the SOF header, which denotes whether the frame is I, B or P, are what the trick play circuits and algorithms look for. The remainder of the content can be encrypted fully or selectively according to any of the selective encryption schemes described in the copending applications, or any other suitable selective encryption content selection criterion.

U.S. Pat. No. 7,151,833 addresses the issue of trick play by an approach that leaves the packet containing the Start of Frame (SOF) in the clear so that a trick play index file may be created by a device receiving (and later playing-out) a stream. Unfortunately, while effectively providing for trick play, sensitive information in the packet containing the SOF is vulnerable to interception and unauthorized use. The packet with the SOF may also contain a pack or sequence header which is typically delivered ahead of the I SOF. By way of example, such sensitive information might include dynamic information needed to properly decompress the content: 1) quantization tables, and 2) picture coding information. It can also include identification as well as usage control information such as: 1) copyright notice, and 2) embedded copy control information (CCI). The SOF packet can also contain actual content, e.g. the first few slices of the frame. By leaving this information in-the-clear, a hacker might be able to reverse engineering Passage™ selective multiple encryption as discussed below or other forms of selective encryption. In addition, the identification of content might not only be compromised, but also the content might be manipulated to always be "copy free" with no restrictions on copying or distribution.

Embodiments consistent with the present invention improve upon the invention of U.S. Pat. No. 7,151,833 by displacing sensitive information or the picture start code and identifier that is normally in the clear in the SOF packet padding (effectively moving it) to another packet. In either case, the packet with the sensitive information gets encrypted.

This approach also can be used with Passage™ selective encryption as described in the cross-referenced documents to the above patent (where the critical information is duplicated and encrypted and other data is left in the clear) since the sensitive information that is typically in the SOF packets can be selected to undergo protection (duplication and encryption). In other words, for example, instead of a packet of the I-frame Picture Header having the critical data being left in the clear to allow trick play, its payload is shifted to a subsequent packet (e.g., the next packet) which can be selected as a "critical packet" for encryption. In this manner, sensitive information is selected for encryption and the ability to expediently carry out trick play is maintained. In another scenario, there may be pack or sequence headers ahead of the picture header with the picture_coding_type identifying field. The pack or sequence headers may contain sensitive information. In this scenario, the pack or sequence header may undergo protection and it is the picture header, with picture_coding_type identifying field, that is moved to a different packet which is left in the clear. Hence, in accordance with certain embodiments consistent with the invention, sensitive data are isolated from the SOF packet (with the picture frame start code and identifier) so that the frame can be identified as I, P or B frame, but the sensitive data is placed in different packet which is encrypted. Thus, the sensitive data is not in the clear, but the identity of the frame is left in the clear to assure that a trick play index file can be created. But, sensitive information is encrypted.

FIG. 1 describes a process 100, in accord with certain embodiments consistent with the present invention, starting at 104. A packet selection criterion is established at 108 for determining which packets are to be encrypted. Such selection criterion can, for example, be established in accord with any of the above-referenced selective encryption selection criteria (including full encryption of all content except SOF header packets) and can be changed from time to time. Once the selection criterion is established, packets can be received at 112. If the packet does not meet the selection criterion at 116, then the packet is not encrypted at 120 and then passes to 126. If the packet does meet the selection criterion at 116, then control passes directly to 126 where the packet is examined to determine if it contains the SOF header. If so, the packet is not encrypted at 128. If not, the packet is encrypted at 130.

Control passes from 128 to 132 where any sensitive information or information that is desired to be protected by encryption is padded out at 132 by inserting data in a manner that shifts the place of the information that is desired to be protected to a subsequent location in the data stream. The padding can be accomplished in any manner that accomplishes the end result of moving the sensitive data to another location in the stream from the picture frame start code and identifier without limitation, and all such methods are properly referred to as padding herein. In the preferred embodiment, the padding function can be carried out using an adaptation field such as that described particularly in section 2.4.3—"Specification of the Transport Stream syntax and semantics" and particularly shown in tables 2-2 and 2-6, for example, in ITU-T Recommendation H.222.0 (July 1995 revision) (also known as ITU-T Rec. H.222.0 (1995E) or ISO/IEC 13818-1: 1996(E)), the full content of which is hereby incorporated by reference. In such an embodiment, the adaptation field method can use stuffing bytes directly or can create bogus data using "private data". To use this technique, an adaptation field is created if one does not already exists. Stuffing bytes, if used, have a value of "1111 1111" as defined in ITU-T H.222.0 as referenced above. And if bogus data is created, it can have any value. Stuffing bytes and the stuffing process are discussed in section 2.4.3 in the tables above as well as at or about pages 20 and 38 thereof (depending upon the pagination of the document). Another possible way to move fields into the next packet would be to use stream syntax. An example of stream syntax would use the "next_start_code( )" function, which is part of the parsing of various header structures, as a way to pad out bits and bytes. Any number of bytes, set to a value of "0000 0000" may be used. Such bytes using the adaptation field or using stream syntax can thus be used to accomplish the padding consistent with embodiments of the present invention. Other padding methods may occur to those skilled in the art upon consideration of the present teachings.

Control then passes from 130 or 132 to 134. At 134, if the last packet has not been encountered, the next packet is received at 112 and the process repeats until the end of the content (last packet) is reached. When the last packet has been received at 134, the process stops at 138. For purposes of this document, it is presumed that the last packet does not contain a SOF header since information from such packets would be padded out to a subsequent packet (which might be a last packet).

Thus, in accord with one embodiment consistent with the invention, a method of selectively encrypting digital video content that involves receiving a plurality of packets containing the digital video content; identifying packets containing start of frame (SOF) headers; inserting padding into the packets to adjust the position of SOF headers with padding in order to keep sensitive data out of the packet with the SOF headers; selecting certain of the packets for encryption according to a selection criterion, wherein the selected packets exclude the padded packets containing SOF headers; encrypting the selected packets; and retaining the padded packets containing the SOF headers unencrypted to form selectively encrypted digital video content.

Thus, in certain embodiments, the selectively encrypted digital video content is stored on an electronic storage medium and/or transmitted to a receiver. In certain embodiments, the selection criterion comprises selection of all packets except those containing the SOF header. In certain embodiments, the selection criterion comprises selection of certain packets except those containing the SOF header where the certain packets represent less than all of the remaining packets excluding those containing the SOF header. In certain embodiments, the method is carried out on a programmed processor. In certain embodiments, the padded packets are padded by insertion of stuffing bytes or bogus data in a private data field of an adaptation field to advance data to a subsequent packet, and/or though the use of fill characters of zeroes, which will get filtered by the next_start_code search feature of decoders, to advance the SOF header to a subsequent packet. In certain embodiments, the selecting involves selecting a packet previous or following the padded packets containing the SOF headers. An electronic storage medium can store instructions that, when executed on a programmed processor, carry out this method.

In another embodiment, a method of decoding selectively encrypted digital video content involves receiving the selectively encrypted digital video content, wherein the selectively encrypted digital video content has unencrypted packets containing start of frame (SOF) headers; wherein, the unencrypted packets containing SOF headers are padded so that contents originally appearing in the packets containing SOF headers are advanced to subsequent packets that are encrypted or kept in the original packets that are encrypted with the SOF headers moved to subsequent packets; calculating offsets for at least one of I frames and P frames from the SOF headers; and storing the calculated offsets as an offset table.

In certain embodiments, the method can further involve accessing the offset table to enable trick play of the selectively encrypted digital video content. In certain embodiments, the selectively encrypted digital video content is stored on an electronic storage medium. In certain embodiments, the selectively encrypted digital video content is transmitted from a content provider to a receiver. In certain embodiments, the encrypted digital video content is fully encrypted except for packets containing the SOF header. In certain embodiments, packets containing the SOF header as well as certain other packets are unencrypted while certain additional packets are encrypted. In certain embodiments, the padded packets are padded by insertion of stuffing bytes in an adaptation field or bogus data in a private data field to advance data to a subsequent packet. In certain embodiments, the selecting involves selecting a packet before or following the packets containing the SOF headers. In certain embodiments, the process can be carried out on a programmed processor. In certain embodiments, an electronic storage medium stores instructions that, when executed on a programmed processor, carry out the method.

Figure 2:
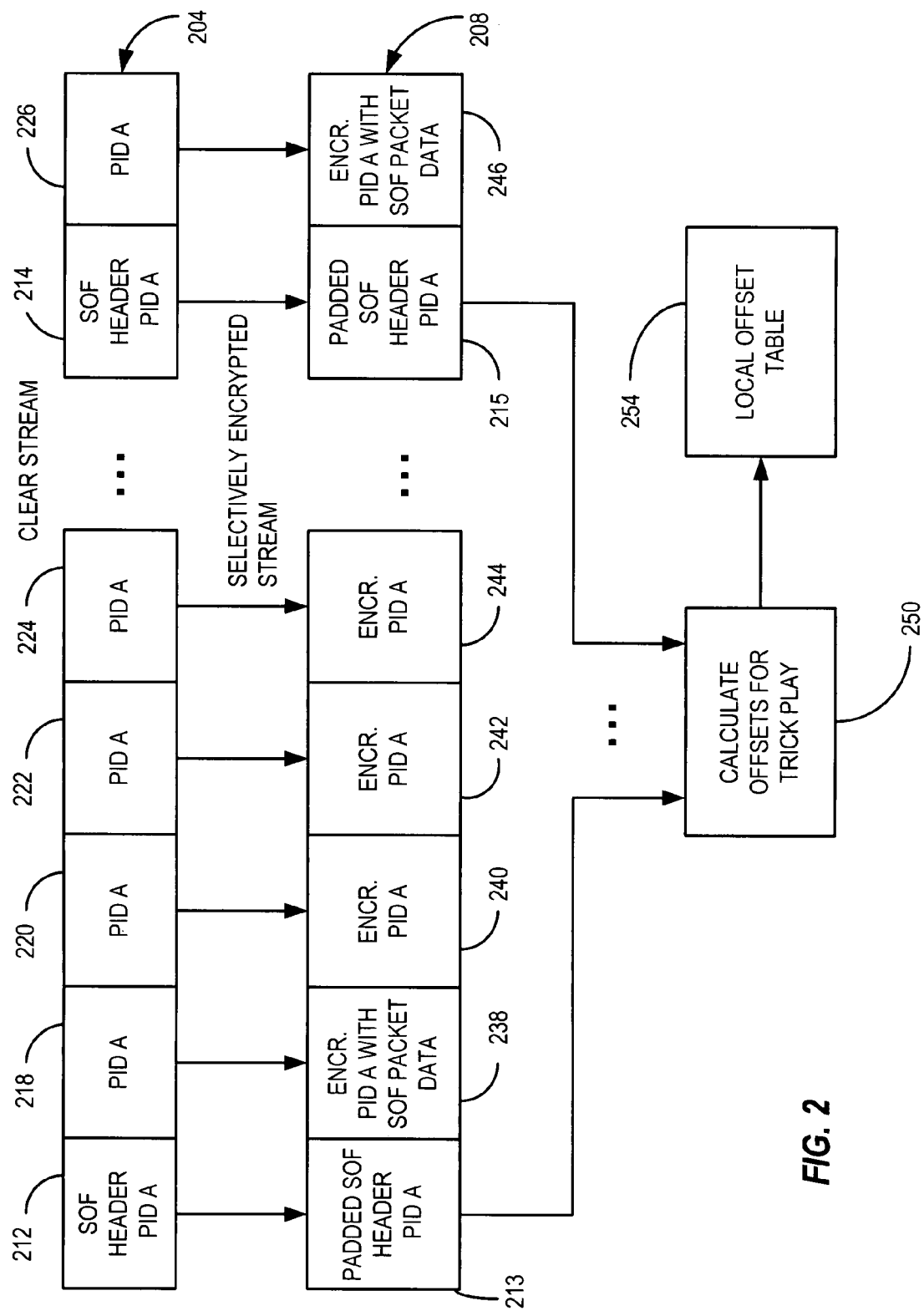
FIG. 2 illustrates one embodiment of a selective encryption and decoding process consistent with certain embodiments of the present invention.

FIG. 2 depicts an embodiment of this process wherein a clear stream of data 204 is converted to a selectively encrypted stream of data 208. Clear stream 204 contains a sequence of packets each having program identifier (PID) A. Packets 212 and 214 contain SOF headers, while packets 218, 220, 222, 224 and 226 contain other information that forms a part of the video data stream. As a part of the encryption process of this example, all packets except those containing SOF headers are encrypted. Thus, packets 212 and 214 are processed by padding out any information that is desired to be encrypted to produce packets 213 and 215, thereby shifting that data to a subsequent packet, and then transferred in their padded form to the selectively encrypted stream 208. Packets 218, 220, 222, 224 and 226 are encrypted to produce encrypted packets 238, 240, 242, 244 and 246, respectively. In this example, for ease of illustration it is presumed that there will remain a 1:1 relationship in the number of packets between SOF header packets, but this is not necessarily the case since the data from the SOF packets 212 and 214 is displaced to other packets. So, the stream of 238, 240, 242, 244, . . . , 246 may in fact include more packets than the number of packets represented by 218, 220, 222, 224, . . . , 226. Moreover, the content of packet 218, for example, will not have a 1:1 correspondence with the content of packet 238 since 238 (at least) introduces data padded forward from packet 212. However, packets represented as 238, 240, 242, 244, . . . will contain all of the information of packets 218, 220, 222, 224, . . . plus the sensitive information from packet 212, for example. This process thus increases the number of packets between each SOF header containing packet by at most one packet, but may not increase the number of packets between two SOF containing packets at all—depending upon the particular content.

At the decoder (e.g., in a television, PVR, television Set-top box (STB) or set back box), the fact that the SOF headers 213 and 215 (for example) are unencrypted enables calculation of offsets for trick play at 240. These offsets can then be stored in a local trick play offset table at 254 to enable rapid access to the proper I and/or P frames, and thus produce trick play and since the sensitive content of the SOF header packets is shifted forward, it remains protected by encryption.

Figure 3:
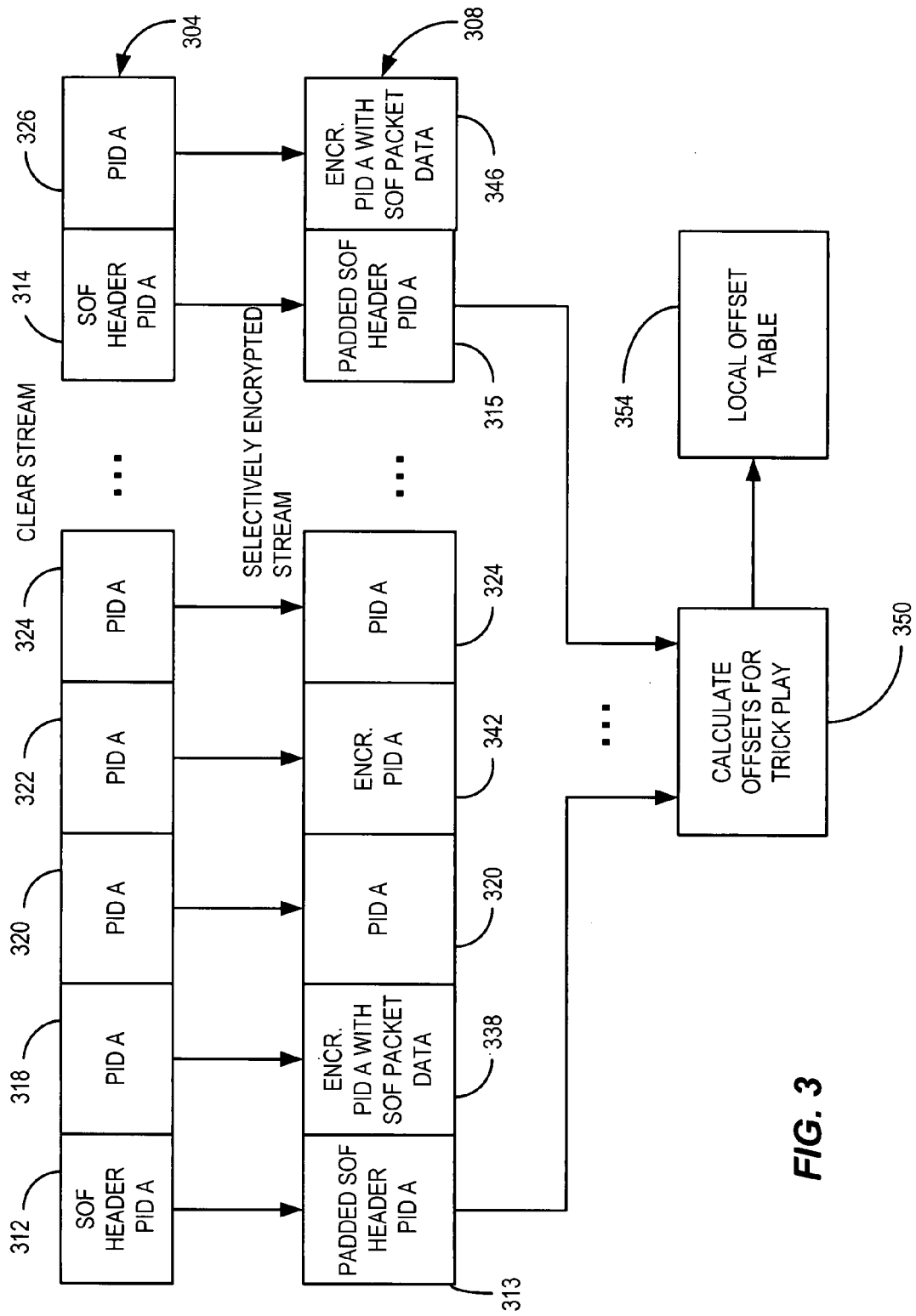
FIG. 3 illustrates another embodiment of a selective encryption and decoding process consistent with certain embodiments of the present invention.

FIG. 3 depicts an embodiment of this process wherein a clear stream of data 304 is converted to a selectively encrypted stream of data 308. In this example, the selective encryption selection criterion is one that only partially encrypts packets not containing SOF headers. However, the selection criterion should encrypt packets following the packet containing SOF headers (assuming that is where the sensitive information from the SOF header is shifted to—in other embodiments, the sensitive information could be shifted to other locations in the stream without limitation). Clear stream 304 contains a sequence of packets each having program identifier (PID) A. Packets 312 and 314 contain SOF headers, while packets 318, 320, 322, 324 and 326 contain other information forming part of the stream of video. As a part of the encryption process of this example, only certain of the packets containing information other than the SOF header are encrypted. As illustrated, packets 312 and 314 are padded to shift out the sensitive information to be protected by encryption and the padded packet is then transferred to the selectively encrypted stream 308 as packets 313 and 315. Packets 318, 322 and 326 are encrypted to produce encrypted packets 338, 342 and 346, respectively, where packets 338 and 346 as shown are packets containing the sensitive information shifted from the packets containing the SOF header. Again, as in the example of FIG. 2, up to one additional packet can be required between each of the SOF header containing packets to account for the padding of data in the SOF header containing packets.

At the decoder (e.g., in a television, PVR, television STB or set back box), the fact that the SOF headers are unencrypted enables calculation of offsets for trick play at 340. These offsets can then be stored in a local trick play offset table at 354 to enable rapid access to the proper I and/or P frames, and thus produce trick play.

When selectively encrypted digital video content is created as streams 208 or 308, the selectively encrypted digital video content can then be stored on an electronic storage medium or transmitted to one or more recipients (e.g., by downloading, streaming or broadcast by a cable or satellite content provider to subscriber's Set-top boxes serving as receivers and decoders.

Hence, certain embodiments of the present invention keep the SOF header packets in the clear, but remove any desired sensitive data that is to be encrypted—by padding the data. This allows commercially available decoder chips such as the model number 7030 manufactured and sold by Broadcom Corporation to calculate the byte offset to I, P and B frames. For trick play operation, the offset allows a decoder (e.g., a Set-top box) to display, for example, every second I Frame or fourth I frame without decoding other content. While the SOF headers are not encrypted, the rest of the content does not need to be completely encrypted, as described above.

Figure 4:
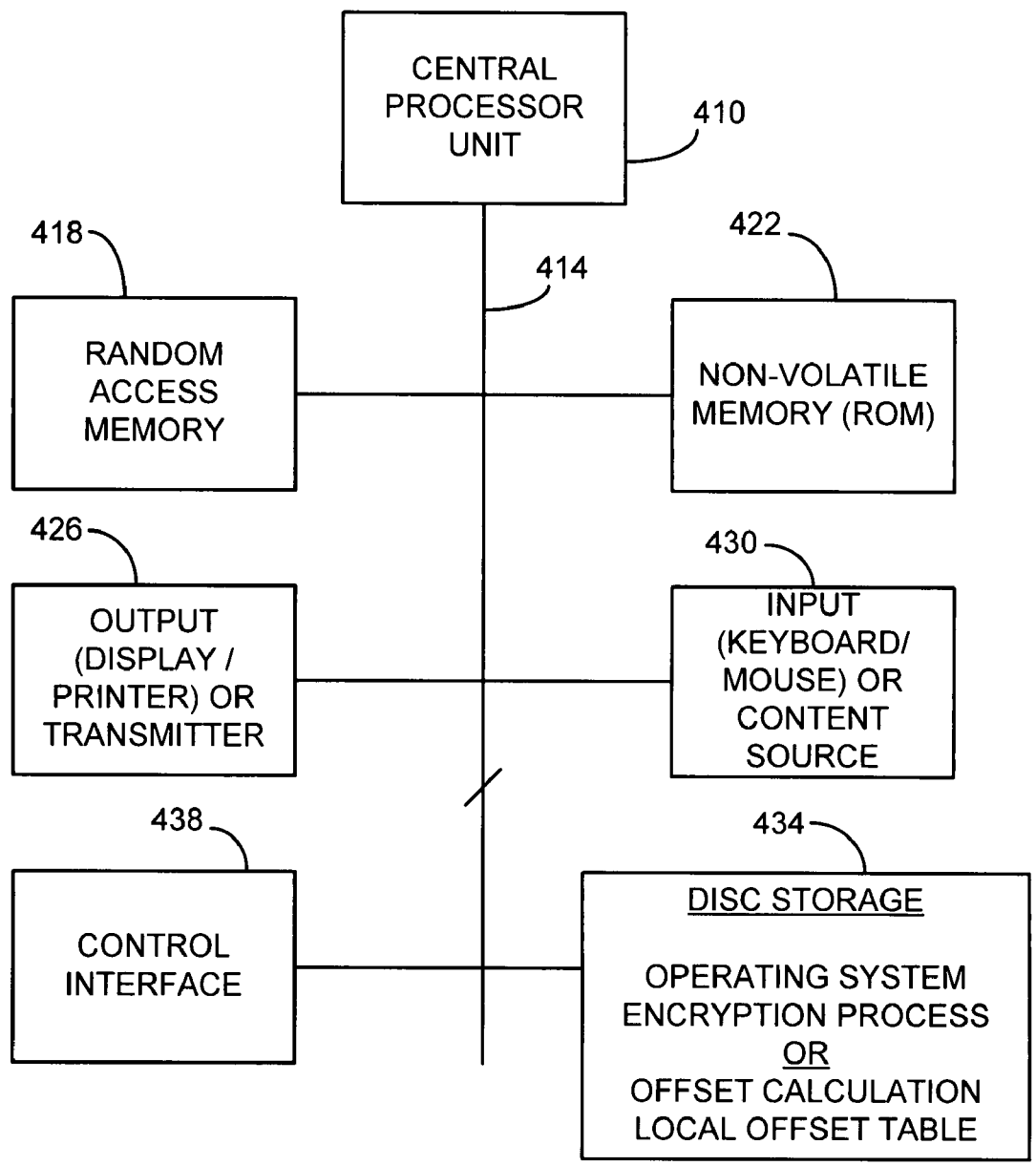
FIG. 4 is a programmed processor which can represent either an encryption processor or a decoder consistent with certain embodiments of the present invention.

The processes (both encoding and decoding) above can be carried out on any suitable programmed general purpose processor operating as a server/encoder such as that depicted as computer 400 of FIG. 4. Computer 400 can represent either an encryption processor or a decoder depending upon programming. Computer 400 has one or more central processor units (CPU) 410 with one or more associated buses 414 used to connect the central processor unit 410 to Random Access Memory 418 and Non-Volatile Memory 422 in a known manner. Output devices 426, such as a display and printer, may be provided in order to display and/or print output for the use of the MSO or user as well as to provide a user interface such as a Graphical User Interface (GUI). In the case of an encoder, the output device 426 encompasses a transmitter for transmitting the encrypted or selectively encrypted content. Similarly, input devices such as keyboard, mouse and removable media readers 430 may be provided for the input of information by the operator. In the case of a television receiver embodiment, input device 430 encompasses a television receiver. In the case of an encoder, the input device encompasses a source of the content being encoded and encrypted. Computer 400 also may incorporate internal and/or external attached disc or other mass storage 434 (e.g., disc and/or optical storage) for storing large amounts of information including, but not limited to, the operating system, encryption processes (for the encryption encoder), or offset calculation and local offset table if computer 400 is used as a decoder (e.g., forming a part of a television STB). The Computer system 400 also has an interface 438 for connection to the cable system if present at the MSO. While depicted as a single computer, the digital content provider may utilize multiple linked computers to carry out the functions described herein. The computer system can also be embodied as a portion of a television receiver device such as a television set top box or PVR or the like in which the decoding processing is carried out. Examples of such devices are well known and depicted in some of the patent applications cross-referenced in U.S. Pat. No. 7,151, 833 and thus need not be explicitly disclosed herein.

Thus, in accordance with certain embodiments, a decoder for decoding selectively encrypted digital video content has a receiver that receives the selectively encrypted digital video content, wherein the selectively encrypted digital video content has unencrypted packets containing start of frame (SOF) headers. The unencrypted packets contain SOF headers that are padded so that contents originally appearing in the packets containing SOF headers are advanced or left in packets that are encrypted. An offset calculator calculates offsets for at least one of I frames and P frames from the SOF headers. A storage device stores the calculated offsets as an offset table.

In certain embodiments, the offset table is accessed to enable trick play of the selectively encrypted digital video content. In certain embodiments, the selectively encrypted digital video content is stored on an electronic storage medium. In certain embodiments, the selectively encrypted digital video content is transmitted from a content provider to a receiver. In certain embodiments, the encrypted digital video content is fully encrypted except for packets containing the SOF header. In certain embodiments, packets containing the SOF header as well as certain other packets are unencrypted while certain additional packets are encrypted. In certain embodiments, the certain other packets include packets immediately following the padded packets containing the SOF headers. In certain embodiments, the offset calculator is implemented by a programmed processor. In certain embodiments, the padded packets are padded by insertion of stuffing bytes in a private data field of an adaptation field to advance data to a subsequent or different packet. The packets may also be padded using stream syntax fill characters which will get filtered by the decoder IC. In certain embodiments, the offset table is stored in an electronic storage medium.

In certain embodiments, a selective encryption encoder for selective encryption of digital video content has an encoder for receiving a plurality of packets containing the digital video content. A processor identifies packets containing start of frame (SOF) headers. The processor further inserts padding into the packets containing SOF headers move the placement of the content of the packets vis-à-vis the SOF headers. The processor selects certain of the packets for encryption according to a selection criterion, wherein the selected packets exclude the padded packets containing start of frame (SOF) headers. An encrypter encrypts the selected packets while retaining the packets containing the SOF headers unencrypted to form selectively encrypted digital video content.

In certain embodiments, an electronic storage medium stores the selectively encrypted digital video content. In certain embodiments, a transmitter for transmitting the selectively encrypted digital video content to a receiver. In certain embodiments, the selection criterion comprises selection of all packets except those containing the SOF header. In certain embodiments, the selection criterion includes selection of certain packets except those containing the SOF header where the certain packets represent less than all of the remaining packets excluding those containing the SOF header. In certain embodiments, the certain other packets comprise packets immediately before or following the padded packets containing the SOF headers. In certain embodiments, the padded packets are padded by insertion of stuffing bytes or fill bytes to move data to a previous or subsequent packet or otherwise relocate the sensitive data to other packets.

Those skilled in the art will recognize that embodiments consistent with the present invention have been described in terms of exemplary embodiments based upon use of a programmed processor (e.g., computer 400). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While certain illustrative embodiments have been described, it is evident that many alternatives, modifications, permutations and variations will become apparent to those skilled in the art in light of the foregoing description.

What is claimed is:

1. A method of selectively encrypting digital video content, comprising:
   receiving a plurality of packets containing the digital video content;
   identifying packets containing start of frame (SOF) headers;
   inserting padding into the packets containing SOF headers to move the content of the packets containing the SOF headers to different packets;
   selecting certain of the packets for encryption according to a selection criterion, wherein the selected packets exclude the packets containing SOF headers;
   encrypting the selected packets; and
   retaining the packets containing the SOF headers unencrypted to form selectively encrypted digital video content.

2. The method according to claim 1, further comprising storing the selectively encrypted digital video content on an electronic storage medium.

3. The method according to claim 1, further comprising transmitting the selectively encrypted digital video content to a receiver.

4. The method according to claim 1, wherein the selection criterion comprises selection of all packets except those containing the SOF header.

5. The method according to claim 1, wherein the selection criterion includes the packet before the ones containing the SOF header.

6. The method according to claim 1, wherein the selection criterion includes the packet after the ones containing the SOF header.

7. The method according to claim 1, wherein the selection criterion comprises selection of certain packets except those containing the SOF header where the certain packets represent less than all of the remaining packets excluding those containing the SOF header.

8. The method according to claim 1, carried out on a programmed processor.

9. The method according to claim 1, wherein the padded packets are padded by insertion of stuffing bytes or bogus data in a private data field of an adaptation field to move data to a different packet.

10. The method according to claim 1, wherein the padded packets are padded by use of fill bytes that will be filtered according to stream syntax.

11. The method according to claim 1, wherein the selecting comprises selecting a packet following the padded packets containing the SOF headers.

12. An electronic storage device storing instructions that, when executed on a programmed processor, carry out the method of selectively encrypting digital video content according to claim 1.

13. A method of decoding selectively encrypted digital video content, comprising:
   receiving the selectively encrypted digital video content, wherein the selectively encrypted digital video content has unencrypted packets containing start of frame (SOF) headers;
   wherein, the unencrypted packets containing SOF headers are padded so that contents originally appearing in the packets containing SOF headers are shifted to packets that are encrypted;
   calculating offsets for at least one of I frames and P frames from the SOF headers; and
   storing the calculated offsets as an offset table.

14. The method according to claim 13, further comprising accessing the offset table to enable trick play of the selectively encrypted digital video content.

15. The method according to claim 13, wherein the selectively encrypted digital video content is stored on an electronic storage medium.

16. The method according to claim 13, wherein the selectively encrypted digital video content is transmitted from a content provider to a receiver.

17. The method according to claim 13, wherein the encrypted digital video content is fully encrypted except for packets containing the SOF header.

18. The method according to claim 13, wherein packets containing the SOF header as well as certain other packets are unencrypted while certain additional packets are encrypted.

19. The method according to claim 13, wherein the padded packets are padded by insertion of stuffing bytes or bogus data in a private data field of an adaptation field to move data to a different packet.

20. The method according to claim 13, wherein the selecting comprises selecting a packet following the padded packets containing the SOF headers.

21. The method according to claim 13, carried out on a programmed processor.

22. An electronic storage device storing instructions that, when executed on a programmed processor, carry out the method of decoding selectively encrypted digital video content according to claim 13.

23. A decoder for decoding selectively encrypted digital video content, comprising:
   a receiver that receives the selectively encrypted digital video content, wherein the selectively encrypted digital video content has unencrypted packets containing start of frame (SOF) headers;
   wherein, the unencrypted packets containing SOF headers are padded so that contents originally appearing in the packets containing SOF headers are moved to different packets that are encrypted;

an offset calculator that calculates offsets for at least one of I frames and P frames from the SOF headers; and a storage device that stores the calculated offsets as an offset table.

24. The decoder according to claim 23, further comprising a programmed processor that, under control of programmed instructions, accesses the offset table to enable trick play of the selectively encrypted digital video content.

25. The decoder according to claim 23, wherein the selectively encrypted digital video content is stored on an electronic storage medium.

26. The decoder according to claim 23, wherein the selectively encrypted digital video content is transmitted from a content provider to a receiver.

27. The decoder according to claim 23, wherein the encrypted digital video content is fully encrypted except for packets containing the SOF header.

28. The decoder according to claim 23, wherein packets containing the SOF header as well as certain other packets are unencrypted while certain additional packets are encrypted.

29. The decoder according to claim 28 wherein the certain other packets comprise packets immediately following the padded packets containing the SOF headers.

30. The decoder according to claim 23, wherein the offset calculator is implemented by a programmed processor.

31. The decoder according to claim 23, wherein the padded packets are padded by insertion of stuffing bytes or bogus data in a private data field of an adaptation field to move data to a different packet.

32. The method according to claim 23, wherein the padded packets are padded by use of fill bytes that will be filtered according to stream syntax.

33. The decoder according to claim 23, wherein the offset table is stored in an electronic storage medium.

34. A selective encryption encoder for selective encryption of digital video content, comprising:

a receiver that receives a plurality of packets containing the digital video content;

a programmed processor programmed with instructions to identify packets containing start of frame (SOF) headers;

the programmed processor be further programmed with instructions to insert padding into the packets containing SOF headers to move the content of the packets containing the SOF headers to different packets and create padded packets containing the SOF headers;

the programmed processor being further programmed to select certain of the packets for encryption according to a selection criterion, wherein the selected packets exclude the padded packets containing start of frame (SOF) headers; and an encrypter for encrypting the selected packets while retaining the padded packets containing the SOF headers unencrypted to form selectively encrypted digital video content.

35. The encoder according to claim 34, further comprising an electronic storage medium for storing the selectively encrypted digital video content.

36. The encoder according to claim 34, further comprising a transmitter for transmitting the selectively encrypted digital video content to a receiver.

37. The encoder according to claim 34, wherein the selection criterion comprises selection of all packets except those containing the SOF header.

38. The encoder according to claim 34, wherein the selection criterion comprises selection of certain packets except those containing the SOF header where the certain packets represent less than all of the remaining packets excluding those containing the SOF header.

39. The encoder according to claim 34, wherein the certain other packets comprise packets immediately following the padded packets containing the SOF headers.

40. The encoder according to claim 34, wherein the padded packets are padded by insertion of stuffing bytes in an adaptation field or bogus data in a private data field to move data to a different packet.

* * * * *